United States Patent [19]

Dugan

[11] Patent Number: 5,496,149
[45] Date of Patent: Mar. 5, 1996

[54] THIN PLATE TURBINE

[75] Inventor: Jeffrey S. Dugan, Asheville, N.C.

[73] Assignee: BASF Corporation, Mount Olive, N.J.

[21] Appl. No.: 401,812

[22] Filed: Mar. 10, 1995

[51] Int. Cl.[6] .................................................. F01D 01/36
[52] U.S. Cl. ................................... 415/90; 415/198.1
[58] Field of Search ............................ 415/90, 198.1;
416/235, 236 R

[56] References Cited

U.S. PATENT DOCUMENTS

| | | | |
|---|---|---|---|
| 1,346,292 | 7/1920 | Becklund | 415/90 |
| 3,020,102 | 2/1962 | Becker | 415/90 |
| 4,036,584 | 7/1977 | Glass | 415/90 |
| 4,218,176 | 8/1980 | Gawne | 415/90 |
| 4,232,992 | 11/1980 | Possell | 415/90 |
| 4,309,143 | 1/1982 | Klatt et al. | 415/90 |
| 4,629,395 | 12/1986 | Mohsin | 415/75 |
| 5,290,145 | 3/1994 | Bernetche-Gonzales | 415/198.1 |
| 5,297,926 | 3/1994 | Negishi | 415/90 |

FOREIGN PATENT DOCUMENTS

| | | | |
|---|---|---|---|
| 0523077 | 10/1953 | Belgium | 415/198.1 |
| 0291268 | 11/1913 | Germany | 415/90 |
| 4314418 | 11/1994 | Germany | 415/198.1 |
| 0004036 | 2/1910 | United Kingdom | 415/90 |

*Primary Examiner*—F. Daniel Lopez
*Assistant Examiner*—Mark Sgantzos
*Attorney, Agent, or Firm*—Depaoli & Frenkel

[57] ABSTRACT

A fluid-powered rotor including one or more circular flow plates an an energy-transferring means, for example, an axle. Each circular flow plate has a circumferential groove near its outer edge with an inlet end and an outlet. The outlet is a through-hole in the circular flow plate and, in the case of a plurality of circular flow plates, is aligned with and connected to the inlet end of the groove in the adjacent downstream circular flow plate. Viscous drag of a fluid passing through the grooves rotates the circular flow plates to produce work.

40 Claims, 2 Drawing Sheets

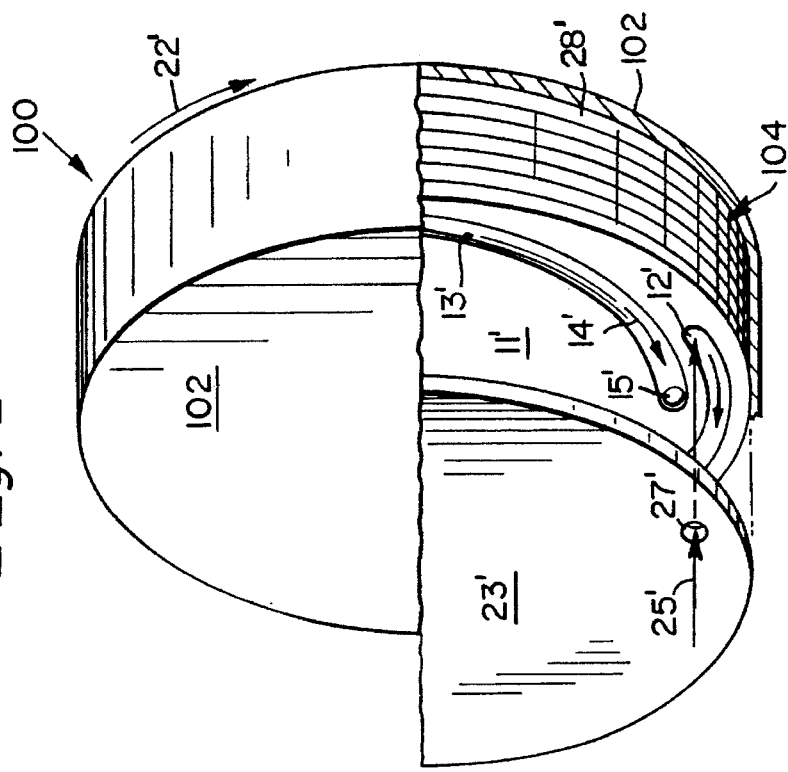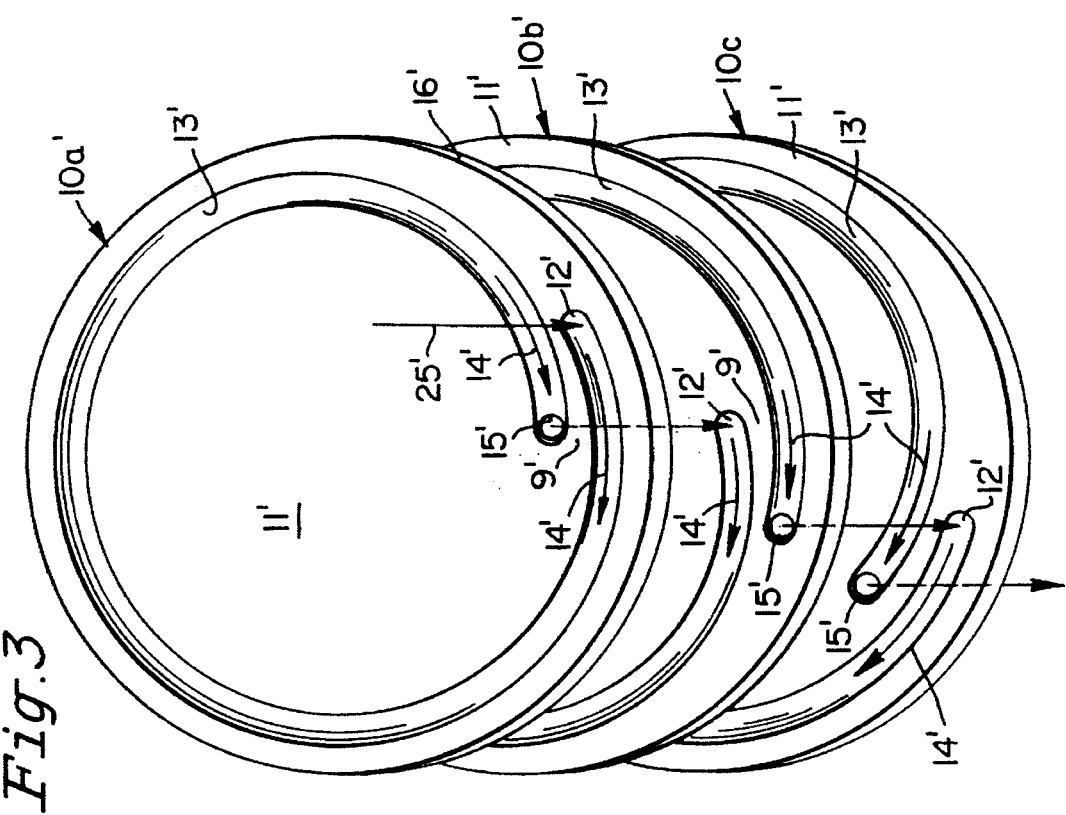

THIN PLATE TURBINE

BACKGROUND OF THE INVENTION

1. Field of the Invention

This invention relates to fluid-powered rotary motors or turbines in which a rotor comprising one or more plate members is drawn in rotation by frictional transfer of energy from a fluid.

2. Review of the Prior Art

In the prior art, the basic concept of using fluid flow to rotate thin, rotor metal disks is well known. Turbine blades are rotated and power generated by a change of momentum as a result of a change of direction of a passing fluid as the fluid meets the rotor. Rotors driven in rotation by the viscous drag upon it of a pressurized fluid are also known. This latter rotor function is the basis of the present invention. The patents mentioned below are examples of the use of thin plates or disks as the active surface in the rotor of a motor or turbine.

U.S. Pat. No. 4,036,584 relates to turbines wherein fluid pressure temperature energy is released by passage from a high-speed delivery nozzle mounted externally and tangentially to closely spaced circular sheet metal plates that can be substantially flat but preferably have concave and convex surfaces which form surface area bodies of revolution. An assembly of disc members forms the turbine rotor within which the surface adhesion of the traversing fluid imparts rotation to the rotor before the fluid is finally expelled through an exhaust duct formed by centrally disposed exits in the assembly. A spiral-like fence baffle on the rear faces of the plates ties adjoining surfaces together and provides expanding fluid flow channels between adjacent plates.

U.S. Pat. No. 4,218,176 discloses a fluid propulsion apparatus which can function as a turbine. The apparatus contains a housing and a plurality of spaced-apart rotatable discs positioned within the housing. The discs are mounted on a shaft and are preferably thin, closely space parallel members of essentially the same diameter and thickness. Each disc optionally has a series of apertures and a series of peripheral grooves or notches which serve to reduce pressure effects in the individual discs caused by rotation of the discs. When the apparatus is used as a turbine, fluid is introduced into a circular peripheral zone which is the region between the interior of the housing and periphery of the discs. From there, the fluid flows in an inwardly spiraling path causing rotation of the discs and shaft. The fluid then exits the housing from a central port in the housing.

U.S. Pat. No. 4,232,992 is directed to a geothermal turbine containing a shaft, a circular metal rotor plate mounted on the shaft, and first and second sets of spaced metal discs situated on opposite sides of the plate. Fluid traverses spiral paths through the spaces between the discs. The steam or vapor portion of the fluid imparts kinetic energy to the first and second sets of discs. As it flows, the steam or vapor portion of the fluid loses velocity due to frictional contact with the first and second sets of discs. As the steam or vapor slows down, it receives kinetic energy from water droplets and solid particles entrained with the steam or vapor. The transferred kinetic energy causes the steam or vapor to increase in velocity and the streams at increased velocity exert an increased drag on the first and second sets of discs and thereby rotate these discs.

U.S. Pat. No. 4,309,143 discloses a turbomolecular pump containing a turbine rotor and a turbine stator, wherein the turbine rotor and the turbine stator are each made up of radial vanes and thin etched metal plates.

U.S. Pat. No. 4,629,395 discloses a fluid-powered rotary motor, comprising a rotor and a housing. The rotor is made up of a shaft and a part which rotates within the housing. A clearance existing between the rotating part and housing has a circular section and is coaxial with the rotor. Fluid is introduced into the clearance and travels circumferentially within the clearance before leaving it. The fluid is introduced into the clearance in such a manner as to avoid any substantial jet-like impingement of the fluid upon the rotor, whereby the rotor is caused to rotate substantially wholly by the hydrodynamic viscous drag exerted on the rotor by the fluid moving circumferentially within the clearance.

The rotors disclosed in the above patents, however, are complicated and difficult to manufacture. A simple, compact, inexpensive, and efficient rotor for a motor or turbine is accordingly needed.

SUMMARY OF THE INVENTION

It is therefore an object of this invention to provide a rotor for a motor or turbine that has a relatively simple design and can be readily constructed.

It is another object to provide a rotor for a motor or turbine made of one or more thin plates that are easy and inexpensive to manufacture.

It is a further object to provide a rotor for a motor or turbine that is easy and quick to assemble from the one or more thin plates.

It is still another object to provide a rotor for a motor or turbine that is easy and quick to disassemble for cleaning and to reassemble.

In accordance with these objects and the principles of this invention, a compact, inexpensive, and potentially efficient rotor for a motor or turbine is provided which comprises one circular flow plate or, preferably, a plurality of circular flow plates stacked in a configuration so that each circular flow plate is in contact with the preceding and following circular flow plate in the stack.

The circular flow plate or plates each contain a narrow circumferential groove on at least one face thereof to channel pressurized fluid flow and a through-hole which allows the fluid to be directed as desired. For example, in the preferred embodiment wherein a stack of circular flow plates is used, each circular flow plate in the stack contains a narrow circumferential groove on at least one face thereof to channel pressurized fluid flow on each circular flow plate and a through-hole which allows the fluid to be directed through the stack of circular flow plates.

In a stack of circular flow plates, the exit of each through-hole in a circular flow plate is aligned with the starting end of the circumferential groove in the following circular flow plate. Thus, the plates are stacked together to create a circular flow path throughout the stack.

The circular flow plate or stack of circular flow plates is in communication with an energy-transferring means. For example, the circular flow plate or stack of circular flow plates can be borne concentrically on a central axle or confined within a concentric cylinder without an axle. As a fluid under pressure begins to flow through the plate or the stack of plates and through the circumferential groove on each plate, the frictional drag of the fluid on the walls of the grooves compels the plate or plates and assembly thereof to turn in the direction of the fluid flow.

The number of circular flow plates in the rotor and/or the groove length and width can be varied to optimize the operation of the rotary motor or turbine. The circular flow plate or stack of circular flow plates can be rigidly enclosed between two end plates, forming an assembly which allows the fluid to flow into and out of the circular flow plate or stack of circular flow plates at the appropriate points.

BRIEF DESCRIPTION OF THE DRAWINGS

FIG. 3 is an elevational view of a second plurality of consecutive circular flow plates or disks which can be contained in the stack of circular flow plates and which form the rotor of this invention, wherein each of the plurality of circular flow plates contains a circumferential groove comprising more than 360° of the plate.

FIG. 4 is a cutaway view of a second embodiment of a rotor assembly in accordance with the invention comprising a plurality of stacked rotatable circular flow plates or disks being disposed within a concentric, circular housing.

DETAILED DESCRIPTION OF THE INVENTION

Figure 2:
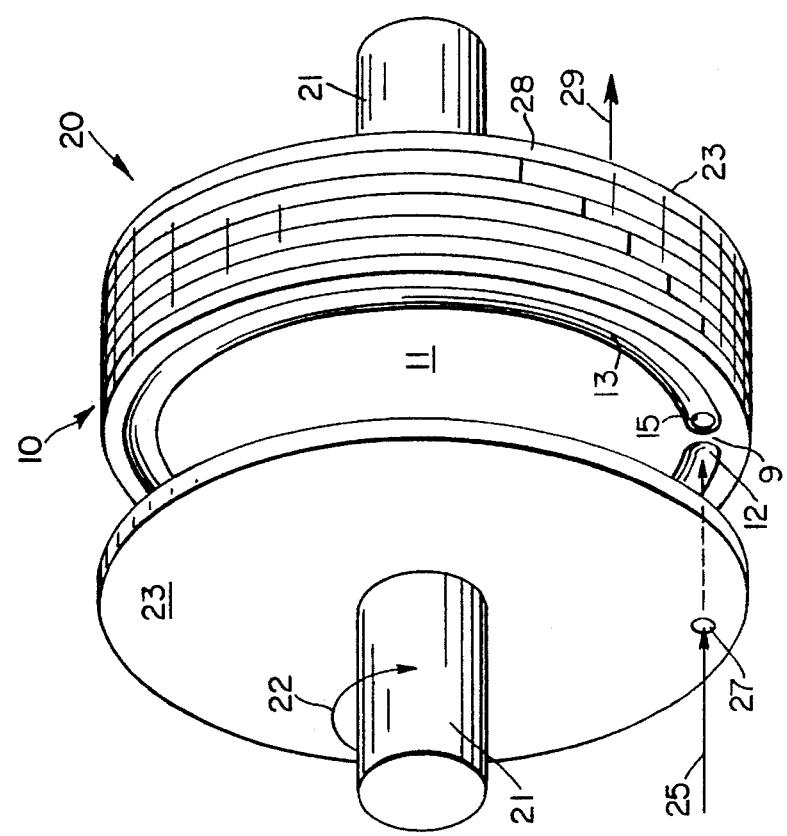
FIG. 2 is a rotor assembly in accordance with the invention comprising a plurality of stacked rotatable circular flow plates or disks placed concentrically around a central rotatable axle.

In accordance with the present invention, there is provided a compact, inexpensive and potentially efficient rotor for use in a motor or turbine which is made from a circular flow plate or disk or a plurality of circular flow plates or disks stacked in a front-to-back configuration, wherein the circular flow plate or stack of circular flow plates is in communication with an energy-transferring means, e.g., an axle around which the plate or plates are concentrically borne. An active surface of each circular flow plate contains a narrow circumferential groove which receives a pressurized fluid and a through-hole. When a stack of circular flow plates is used, the through-hole in each circular flow plate allows the fluid after it circumscribes the circumferential groove to pass through to the succeeding circular flow plate in the stack.

In accordance with the operation of the rotor of this invention, a pressurized fluid is directed to the active face of each circular flow plate in the assembly and as the fluid begins to flow through the groove, the frictional drag of the fluid on the walls of the grooves compels the circular flow disk or all of the circular flow disks in a stack of circular flow disks to turn in direction of the fluid flow, thus, further rotating the energy-transferring means, e.g. axle. As this occurs, the fluid in the grooves accelerates with the circular flow plate or plates. As the fluid accelerates, its velocity relative to the grooves, and thus the driving force, decreases, causing a deceleration in the rotation of the assembly. This decreased rotation allows the velocity of the fluid relative to the grooves to increase again, re-establishing the rotational driving force. Thus a steady-state balance of forces is achieved with a rapidly spinning assembly and relatively slow flow-through of the fluid (i.e., the potential energy of the fluid is very efficiently converted into kinetic energy in the spinning turbine).

The shape, dimensions and composition of the circular flow plate or plates used in the rotor of this invention may be the same as those found in plates used in conventional rotors.

Preferably, the circular flow plate or flow plates in the rotor of this invention are thin, e.g., having a thickness at least about 0.001 inch, preferably from about 0.001 inch to about 1.0 inch, more preferably from about 0.001 inch to about 0.25 inch, and most preferably from about 0.01 inch to about 0.10 inch.

Suitable materials for use in the circular flow plate or flow plates include metals, such as for example, stainless steel, aluminum, aluminum-based alloys, nickel, iron, copper, copper-based alloys, mild steel, brass, titanium, and other micromachinable metals. Because it is relatively inexpensive to use, stainless steel is typically used in the circular flow plate or flow plates of this invention. Other materials could be used including plastics, ceramics and composites of the above as long as such materials have the strength and wear resistance to withstand the work load and environment in which the rotor is placed.

The grooves in the circular flow plate or plates used in the rotor of this invention may be formed by any machining process (e.g., drilling, reaming and the like) conventionally used to form grooves. Preferably, the grooves are formed by a micromachining process, such as, for example, etching, stamping, punching, pressing, cutting, molding, milling, lithographing, particle blasting, or combinations thereof. Most preferably, the grooves are formed by etching processes, e.g., photochemical etching. Etching provides precisely formed grooves while being less expensive than many other conventional machining processes. Furthermore, etched perforations generally do not have the sharp corners, burrs, and sheet distortions associated with mechanical perforations. Etching processes are well known in the art. Typically, etching is carried out by contacting a surface with a conventional etchant.

The rotor of this invention can be used as conventional rotors are used, e.g., in turbines or motors.

A more detailed description of the individual plates and rotor assembly in a preferred embodiment of the rotor of this invention and a better understanding thereof can be obtained from a description of FIGS. 1 to 4.

Figure 1:
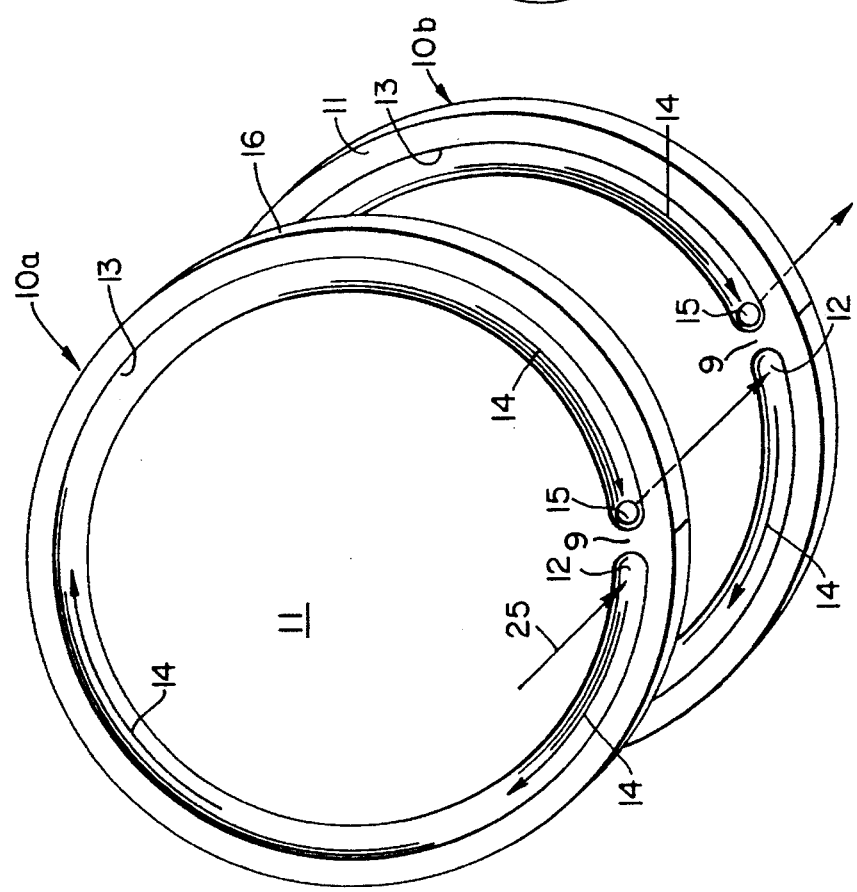
FIG. 1 is an elevational view showing the relationship between a pair of consecutive circular flow plates or disks which are contained in the stack of circular flow plates and which form the rotor of this invention.

As shown in FIGS. 1 and 2, rotor assembly 20 comprises an axle 21 and a plurality of adjacent circular flow plates 10 configured as a stack and having flat surfaces 11. The flat surfaces 11 of adjacent flow plates 10 contact each other on a back-to-front configuration. The stack of plates 10 are preferably sandwiched between respective end plates, i.e., input plate 23 and output plate 28. Although not shown in FIG. 2, each flow plate 10 is keyed to axle 21 for transmission of the rotational force generated by flow plates 10, thereby causing rotation of axle 21 as shown by rotation arrow 22.

Front face or surface 11 of each plate 10 contains a circumferential groove 13 which is concentric with and close to the circular edge 16 of flow plate 10. Although it is preferred that groove 13 be disposed proximate the edge of the flow plate, the groove can be disposed midway between the edge and the center of the plate or even closer to the center. However, the closer groove 13 is located relative to edge 16, the longer the travel path for fluid and the greater is the work transferred to each plate 10. Groove 13 can be in the form of a spiral-shaped groove and thereby cover 360° or more of surface 11. Preferably, however, groove 13 covers less than 360° of surface 11, and more preferably substantially (although less than) 360° of surface 11. A space 9 on surface 11 interrupts groove 13 and spaces fluid inlet end 12 from fluid outlet 15 placed at opposing ends of each groove 13. In operation, a pressurized fluid moves through groove 13 formed in each plate 10 along a circular path indicated by arrow 14 to cause rotation of flow plates 10.

Fluid flow through the stack of flow plates 10 can be described by referring to FIG. 1. As shown, flow plate 10a has a fluid inlet end 12 and a fluid outlet 15 placed on opposite ends of groove 13. Fluid outlet 15 comprises a through-hole which extends entirely through flow plate 10a and is aligned with and connected to fluid inlet end 12 of groove 13 in adjacent flow plate 10b. Fluid exits groove 13 in plate 10b through fluid outlet 15 in plate 10b as in plate 10a. Fluid outlet 15 in plate 10b is aligned with and connected to the fluid inlet end contained in the groove in the third flow plate, and so on through the stack of flow plates. In other words, the fluid outlet of each groove 13 is aligned with and connected to the fluid inlet end of the groove 13 in the succeeding flow plate 10 contained in the stack.

Referring again to FIG. 2, the stack assembly 20 of flow plates 10 can be sandwiched between inlet plate 23 and outlet plate 28. During operation of rotor or stack assembly 20, a high-pressure fluid 25 enters opening 27 in fluid inlet plate 23 and is fed to fluid inlet end 12 contained in one end of groove 13 in the first plate 10 of assembly 20. The pressurized fluid moves circularly through groove 13 to fluid outlet 15 placed at the opposite end of the groove from fluid inlet end 12. From fluid outlet 15, the pressurized fluid passes through plate 10 to the inlet end 12 in groove 13 of the succeeding downstream plate in assembly 20. Eventually, the pressurized fluid moves downstream through each of the flow plates 10 in assembly 20 and out through an outlet (not shown) in outlet plate 28, finally exiting assembly 20 as low-pressure fluid 29, having transmitted its pressure energy to rapidly spinning plates 10.

The pressurized fluid used to cause rotation of plates 10 in rotor assembly 20 can be a gas such as air, combustion gas, methane, inert gas, etc, or a liquid, e.g. water. The rotor can be used to generate electricity or work via transfer from rotating axle 21.

While the invention has been described herein with respect to producing work in a turbine or rotor wherein the energy-transferring means is typically described as an axle, the scope of the invention can include any energy-transferring means which can transfer work generated by rotatable disks into power. Examples of such energy-transferring devices include not only axles as previously described herein but also any movable surface which comes into contact with rotatable disks and is itself moved thereby. Thus, the broadest aspect of the invention includes any energy-transferring device in communication with the rotating disks including energy-transferring devices which are in direct contact with the disks. The energy-transferring device can be used to generate electrical power when the disks are composed of magnetic material and a wire is situated in proximity to the disks, e.g., as where a wire is wound around a concentric cylinder or other housing within which the disks are disposed.

As shown in FIGS. 3 and 4, rotor assembly 100 comprises a concentric circular housing 102 within which is disposed a plurality of adjacent circular flow plates configured as a stack 104 and having flat surfaces 11'. The flat surfaces 11' of the adjacent flow plates in stack 104 contact each other on a back-to-front configuration. The plates in stack 104 are preferably sandwiched between respective end plates, i.e., input plate 23' and output plate 28'. Although not shown in FIG. 4, the plates in stack 104 are disposed in physical contact with housing 102 for transmission of the rotational force generated by the plates in stack 104, thereby causing rotation of housing 102 as shown by rotation arrow 22'.

Front face or surface 11' of each plate in stack 104 contains a circumferential groove 13' which is concentric with and close to the circular edge 16' of the plate. Groove 13' is in the form of a spiral-shaped groove covering more than 360° of surface 11'. A space 9' on surface 11' interrupts groove 13' and spaces fluid inlet end 12' from fluid outlet 15' placed at opposing ends of each groove 13'. In operation, a pressurized fluid moves through groove 13' formed in each plate in stack 104 along a circular flow path indicated by arrow 14' to cause rotation of the flow plates in stack 104.

Fluid flow through the stack 104 of flow plates can be described by referring to FIG. 3. As shown, flow plate 10a' has a fluid inlet end 12' and a fluid outlet 15' placed on opposite ends of groove 13'. Fluid outlet 15' comprises a through-hole which extends entirely through flow plate 10a' and is aligned with and connected to fluid inlet end 12' of groove 13' in adjacent flow plate 10b'. Fluid exits groove 13' in plate 10b' through fluid outlet 15' in plate 10b' as in plate 10a'. Fluid outlet 15' in plate 10b' is aligned with and connected to the fluid inlet end 12' contained in groove 13' in third flow plate 10c, and so on through the stack of flow plates. In other words, the fluid outlet of each groove 13' is aligned with and connected to the fluid inlet end of the groove 13' in the succeeding flow plate contained in stack 104.

Referring again to FIG. 4, the plates in stack 104 can be sandwiched between inlet plate 23' and outlet plate 28'. During operation of rotor 100, a high-pressure fluid 25' enters opening 27' in fluid inlet plate 23' and is fed to fluid inlet end 12' contained in one end of groove 13' in the first plate in stack 104. The pressurized fluid moves circularly through groove 13' to fluid outlet 15' placed at the opposite end of the groove from fluid inlet end 12'. From fluid outlet 15', the pressurized fluid passes through a plate in stack 104 to the inlet end 12' in groove 13' of the succeeding downstream plate in stack 104. Eventually, the pressurized fluid moves downstream through each of the flow plates in stack 104 and out through an outlet (not shown) in outlet plate 28', finally exiting stack 104 as low-pressure fluid 29', having transmitted its pressure energy to the rapidly spinning plates in stack 104.

EXAMPLE

A turbine composed of a stack of three circular flow plates is provided. Each circular flow plate in the stack has a thickness of about 0.1 inch and a diameter of about 3.5 inches. A circular groove is etched into each of the circular flow plates. The grooves each have a width of about 0.10 inch and a depth of about 0.06 inch, and the center of each groove forms a nearly complete circle having a diameter of about 3 inches. Each groove terminates at a through-hole having a diameter of about 0.09 inch. The length of each groove is about 9.2 inches, with the combined length of all the grooves in the stack of circular flow plates being 2.3 feet. A cover plate with a through-hole is disposed on the first circular flow plate in the stack.

Water at a temperature of 15° C. and a pressure of 10 lb/sq. in (psig) is introduced through the through-hole in the cover plate and directed to the circular flow plates. The stack of circular flow plates begins to spin, and after reaching a steady-state spinning speed of about 50 rotations per minute, the water flows through the stack at a flow rate of about 70 grams per minute.

While a specific embodiment of the invention is disclosed and described herein, it will be apparent that various modifications may be made without departing from the spirit and scope of the invention as defined by the following claims.

What is claimed is:

1. A plate-type rotor comprising:
   (A) at least one circular flow plate, each circular flow plate comprising a circumferential groove formed on a first facial surface of said circular flow plate, said groove having a fluid inlet end and a fluid outlet comprising a through-hole flow passage in said circular flow plate, wherein said through-hole flow passage extends from said first facial surface to an opposite second facial surface of said circular flow plate, said through-hole passage extending in a direction which is substantially normal to said first facial surface; and
   (B) an energy-transferring means in communication with said at least one circular flow plate.

2. A flow plate for rotation in a rotor comprising a substantially flat, circular plate having on at least one surface thereof a circumferential groove, said groove having a fluid inlet end and a fluid outlet comprising a through-hole in said circular plate.

3. A method of converting potential energy into work, comprising the steps of:
   (1) providing a plate-type rotor comprising:
      (A) at least one circular flow plate, each circular flow plate comprising a circumferential groove formed on a facial surface of said circular flow plate, said groove having a fluid inlet end and a fluid outlet comprising a through-hole flow passage in said circular flow plate, wherein said through-hole flow passage extends from said first facial surface to an opposite second facial surface of said circular flow plate, said through-hole passage extending in a direction which is substantially normal to said first facial surface; and
   (2) passing a pressurized fluid through each circumferential groove, said fluid entering said groove by means of said fluid inlet and exiting said groove by means of said fluid outlet, said passing of said fluid through said groove causing said at least one circular flow plate to rotate, said rotating at least one circular flow plate generating said work.

4. A plate-type rotor, comprising:
   (A) a plurality of circular flow plates stacked for contact with adjacent circular flow plates in the stack, each circular flow plate comprising a circumferential groove, said groove having a fluid inlet end and a fluid outlet comprising a through-hole in said circular flow plate, wherein said through-hole of said fluid outlet in said circumferential groove in each of said circular flow plates is aligned with and connected to a fluid inlet end of a circumferential groove disposed on an adjacent downstream circular flow plate; and
   (B) an energy-transferring means in communication with said circular flow plates.

5. A method of converting potential energy into work, comprising the steps of:
   (1) providing a plate-type rotor comprising:
      (A) a plurality of circular flow plates stacked for contact with adjacent circular flow plates in the stack, each circular flow plate comprising a circumferential groove, said groove having a fluid inlet end and a fluid outlet comprising a through-hole in said circular flow plate, wherein said through-hole of said fluid outlet in said circumferential groove in each of said circular flow plates is aligned with and connected to a fluid inlet end of a circumferential groove disposed on an adjacent downstream circular flow plate; and
      (B) an energy-transferring means in communication with said circular flow plates; and
   (2) passing a pressurized fluid through each circumferential groove, said fluid entering said groove by means of said fluid inlet and exiting said groove by means of said fluid outlet, said passing of said fluid through said groove causing said circular flow plates to rotate, said rotating circular flow plates generating said work.

6. The rotor of claim 1, wherein the rotor comprises a plurality of said at least on circular flow plate, wherein said circular flow plates are stacked for contact with adjacent circular flow plates in the stack, further wherein said through-hole of said fluid outlet in said circumferential groove in each of said circular flow plates is aligned with and connected to a fluid inlet end of a circumferential groove disposed on an adjacent downstream circular flow plate.

7. The rotor of claim 1, wherein the circumferential groove is disposed proximate the edge of said circular flow plate.

8. The rotor of claim 1, wherein the energy-transferring means comprises a movable means in physical contact with said at least one circular flow plate.

9. The rotor of claim 8, wherein said movable means comprises an axle.

10. The rotor of claim 9, wherein said at least one circular flow plate is placed in concentric contact with said axle, said axle being centrally disposed through said at least one circular flow plate.

11. The rotor of claim 8, wherein said movable means comprises a rotatable, concentric cylindrical housing within which said at least one circular flow plate is disposed.

12. The rotor of claim 1, wherein said fluid inlet end and said fluid outlet are placed on opposite ends of said circumferential groove.

13. The rotor of claim 1, wherein said circumferential groove comprises 360° or more of said at least one circular flow plate.

14. The rotor of claim 1, wherein said circumferential groove comprises less than 360° of said at least one circular flow plate.

15. The rotor of claim 14, wherein said circumferential groove comprises substantially but less than 360° of said at least on circular flow plate.

16. The rotor of claim 1, wherein said at least one circular flow plate is sandwiched between opposing end plates comprising an inlet plate and an outlet plate.

17. The rotor of claim 16, wherein said inlet plate contains a through-hole aligned with the fluid inlet end of said groove of said at least one circular flow plate and said outlet plate contains a through-hole aligned with said through-hole of said fluid outlet of said groove of said at least one circular flow plate.

18. The rotor of claim 1, wherein said groove is formed by micromachining.

19. The rotor of claim 18, wherein said groove is formed by etching.

20. The rotor of claim 1, wherein said at least one circular flow plate is made of metal.

21. The rotor of claim 1, wherein said at least one circular flow plate has a thickness of at least about 0.001 inch.

22. The rotor of claim 21, wherein said at least one circular flow plate has a thickness of from about 0.001 inch to about 1.0 inch.

23. The rotor of claim 22, wherein said at least one circular flow plate has a thickness of from about 0.001 inch to about 0.25 inch.

24. The rotor of claim 23, wherein said at least one circular flow plate has a thickness of from about 0.01 inch to about 0.10 inch.

25. The rotor of claim 1, wherein all said circumferential grooves and all said through-holes form a continuous flow path for high-pressure fluid entering said rotor.

26. The flow plate of claim 2, wherein said circumferential groove is disposed proximate the edge of said circular plate.

27. The flow plate of claim 2, wherein said fluid inlet end and said fluid outlet are placed on opposite ends of said circumferential groove.

28. The flow plate of claim 2, wherein said circumferential groove comprises 360° or more of said circular plate.

29. The flow plate of claim 2, wherein said circumferential groove comprises less than 360° of said circular plate.

30. The flow plate of claim 29, wherein said circumferential groove comprises substantially but less than 360° of said circular plate.

31. The flow plate of claim 2, wherein said circumferential groove is formed by micromachining.

32. The flow plate of claim 30, wherein said circumferential groove is formed by etching.

33. A turbine comprising the rotor of claim 1.

34. A motor comprising the rotor of claim 1.

35. A method according to claim 3, wherein the rotor comprises a plurality of said at least one circular flow plate, wherein said circular flow plates are stacked for contact with adjacent circular flow plates in the stack, further wherein said through-hole flow passage of said fluid outlet in said circumferential groove in each of said circular flow plates is aligned with and connected to a fluid inlet end of a circumferential groove disposed on an adjacent downstream circular flow plate.

36. The rotor of claim 1, wherein said rotor consists essentially of said at least one circular flow plate and said energy-transferring means.

37. The rotor of claim 6, wherein said plurality of circular flow plates are stacked between opposing end plates comprising an inlet plate and an outlet plate.

38. The rotor of claim 37, wherein said inlet plate contains a through-hole flow passage aligned with the fluid inlet end of said groove of a first circular flow plate in said stack and said outlet plate contains a through-hole flow passage aligned with said through-hole of said fluid outlet of said groove in a last circular flow plate of said stack.

39. A method according to claim 3, wherein said fluid passes through said circumferential groove in a counter-clockwise direction from said inlet end to said outlet.

40. A method according to claim 39, wherein said fluid passes through said circumferential groove in a clockwise direction from said inlet end to said outlet.

* * * * *